April 25, 1939.  G. L. WENDT ET AL  2,156,212
TREATMENT OF VAPORS FROM COFFEE ROASTING
Filed Feb. 25, 1936
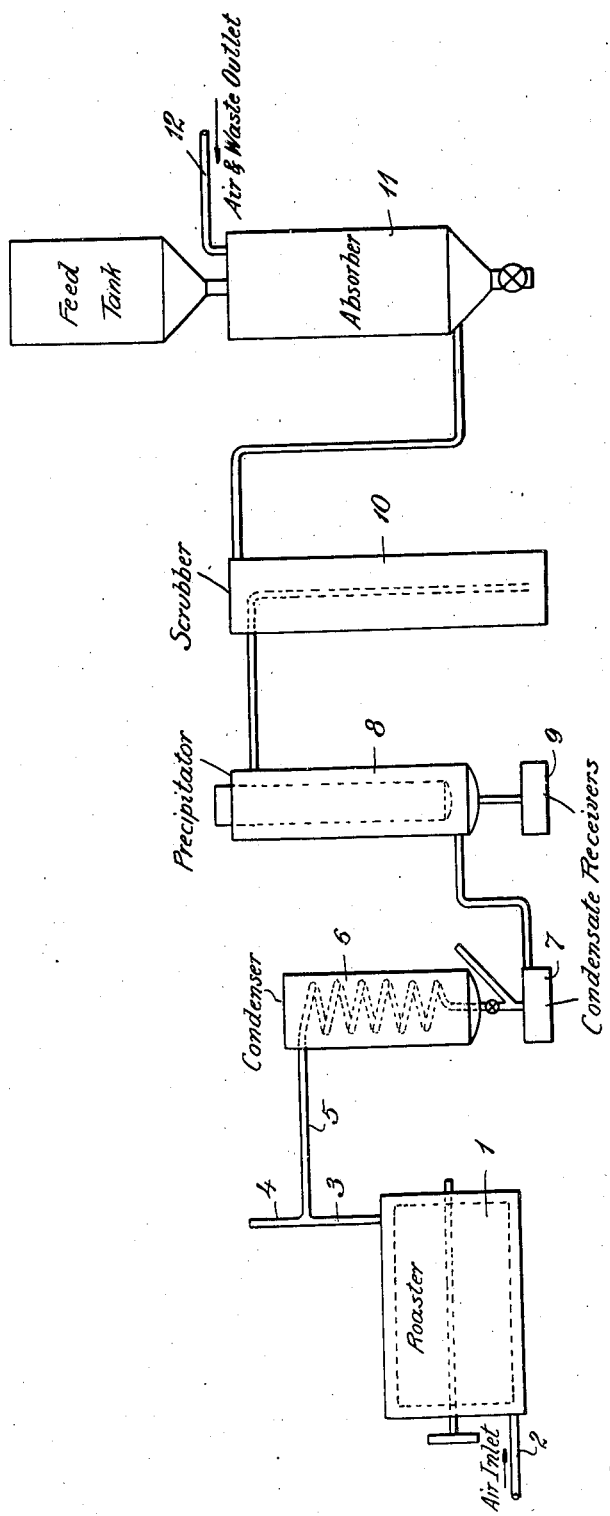
INVENTOR
Gerald L. Wendt
Douglas Fronmuller
BY
ATTORNEYS Patented Apr. 25, 1939

2,156,212

UNITED STATES PATENT OFFICE 2,156,212

TREATMENT OF VAPORS FROM COFFEE ROASTING

Gerald L. Wendt, New York, and Douglas Fronmuller, Middle Village, Long Island, N. Y., assignors to Coffee Products Corporation, New York, N. Y., a corporation of New York Application February 25, 1936, Serial No. 65,584

10 Claims. (Cl. 99—71)

This invention relates to an improved process for the recovery of valuable aromatic principles evolved during the roasting of coffee, and to improved coffee products. It relates more particularly to the selection of roaster gases rich in aromatic principles, and to the purification of such selected gases and vapors, with subsequent recovery of the aromatic principles in such selected and purified gases or their incorporation in a coffee product, such as coffee extract, coffee powder, roasted coffee, etc. It includes such coffee products having incorporated in them these aromatic principles.

The constituents given off when green coffee beans are roasted include not only the valuable aromatic principles previously referred to, but also a large proportion of water and a quantity of material which is of no value from the viewpoint of coffee flavor, and in fact, if introduced into a coffee extract or product imparts an objectionable, even repulsive, flavor to the product. The present invention provides a process for the selective separation and recovery of the desirable aromatic principles, whereby these constituents of the roaster gases or vapors are incuded in a coffee product, such as a coffee extract, concentrate, powder or roasted coffee, without incorporating simultaneously large quantities of water vapor, or objectionably flavored constituents. The constituents evolved during roasting which are objectionably flavored, and undesirable for use in coffee products, may be discharged to waste, or may be recovered separately from the desirable constituents, and separately processed for the recovery of other products, such as caffeine, theobromine, etc., which may be recovered by conventional methods.

It has been proposed to recover coffee values from the roaster gases or vapors by absorbing them in a solvent, such as mineral oil or a mineral oil derivative, but such processes have not provided the selective recovery which we have found essential if in such recovery objectionably flavored constituents are not to be included in the final product.

We have found that, in the roasting of coffee, the vapors evolved are of varied character, and that the constituents of the vapors vary widely as the roasting operation progresses. We have found that the vapors given off during the primary stage of the operation consist mainly of water vapor, with a proportion of objectionably flavored constituents, and almost no valuable coffee principles. As the roasting operation progresses, and the beans become dried and hot, a critical stage is reached at which the beans crackle and pop, and a sudden large increase in the volume of gases evolved occurs. It is at this point that the evolution of valuable aromatic principles begins, although the vapors also include water vapor and some objectionably flavored constituents. This is the secondary stage of the roasting operation. In our process, the vapors from the primary stage of the roasting operation are discarded, or processed separately, for the recovery of such commercial products as they may contain, and those from the secondary stage are selected, purified, and passed into contact with a coffee product, such as liquid coffee concentrate, coffee powder, roasted coffee, etc., whereby such product absorbs from the selected and purified vapors the desirable aromatic principles, and is markedly enriched, or are compressed and liquefied, or absorbed in a solvent such as glycerin, as desired.

In a typical roasting operation, for example, green coffee beans are introduced into an electrical roaster, and heat is applied to them. The beans are agitated to avoid local overheating. After a few minutes, vapors begin to come off from the beans. This initial vapor consists mainly of water vapor, but contains some caffeine and some undesirable, objectionably flavored constituents. After ten to twelve minutes more, the beans begin to crackle and pop, and a great increase in the volume of vapors takes place. At about this time the heat is turned off, although it will be understood that the exact point at which the heat is turned off will depend upon the degree of roasting desired, i. e., whether a light or dark roast is desired. The evolution of vapors continues for a few minutes after the heat is turned off. These vapors are rich in desirable aromatic coffee principles.

These aromatic principles, which are desirable to include in the coffee extract or powder, are of the nature of permanent gases. They are light gases or vapors, rather insoluble in water and mineral oils, and are non-condensable, at least at ordinary or somewhat lower temperatures and normal pressure. They are, however, readily absorbed by a cold, concentrated aqueous coffee extract or by a soluble coffee powder, and by roasted coffee. They may also be recovered by absorption in other absorbents, such as glycerin, or by compression and cooling to produce a highly concentrated product, suitable for use, for example, in the production of essential oils. Thus after proper segregation of these principles from the water vapor and the undesirable constituents of the roaster gases or vapors, the segregated principles may be absorbed in a cold, concentrated coffee extract, in a soluble coffee powder, or in roasted coffee. We have found it particularly advantageous to absorb them in a cold, concentrated coffee extract.

Thus the present invention essentially provides for the proper selection and separation of desirable aromatic principles from roaster gases or vapors, and their inclusion in a marketable coffee product, such as a coffee concentrate, coffee powder, or roasted coffee. The selection and separation of the aromatic principles involves two factors, the first of which is the selection of the proper vapors to treat, i. e., the selection of vapors from the secondary stage of the roasting operation, and the second of which is proper treatment of these vapors to introduce into the coffee product the desirable constituents, and discard the undesirable constituents.

This latter operation may involve cooling the selected vapors to condense water and condensable materials, passing the vapors through an electrical precipitator to remove mist and entrained solid or liquid particles, absorbing fatty material in a suitable solvent, such as mineral oil, glycerin, or the like, and finally passing the purified vapors into intimate contact with coffee concentrate, soluble coffee powder, etc., although one or more of these operations may be omitted if desired.

The invention will be illustrated by the following example, although it is to be understood that it is not limited thereto:

*Example.*—Green coffee beans are introduced into an enclosed electrical roaster, the heat is turned on, and a current of gas is passed through the roaster to carry any evolved vapors along with it through the apparatus designed to recover the aromatic coffee principles. Air, as the most readily available gas, may be advantageously used, although other gases may of course be used. The beans are agitated to prevent local overheating. After three or four minutes, vapors begin to come off. After ten to twelve minutes more, the beans begin to crackle and pop, and the evolution of vapors greatly increases. At this point the heat is turned off. The evolution of vapors continues for three or four minutes.

The vapors given off prior to the time when the beans begin to crackle and pop, and prior to the concomitant increase in the volume of vapor, are discarded. The vapors subsequently given off are passed through a condenser, in which they are cooled to 50–69° C. or lower, and most of the water is condensed out. A considerable amount of aromatic material is condensed out with the water, but the flavor of this material is undesirable and objectionable. The vapors cooled to 50–60° C. are then passed through an electrical precipitator (Cottrell), in which any entrained material is precipitated. The amount of material removed in this precipitator is relatively small, but of a decidedly objectionable taste. The effluent vapors have a faint, fatty odor. They are then passed through an absorbent material impregnated with mineral oil to remove the constituents responsible for this fatty odor, and are then scrubbed with cold, concentrated coffee extract, which absorbs the desirable aromatic constituents.

The invention will be further illustrated by reference to the accompanying flow sheet, which shows in conventional and diagrammatic fashion apparatus suitable for carrying out the process.

Green coffee beans are introduced into roaster 1, and heat is turned on. A current of air is introduced through inlet 2 of the roaster to carry the vapors emitted forward through the treating apparatus. The air, and vapors, pass up pipe 3. At the start, when the vapors do not contain much desirable coffee principles the vapors and air are discharged through pipe 4 and to waste. When the critical period is reached, however, and the beans begin to crackle and pop, and emit large quantities of vapor with a large proportion of desirable coffee values, the vapors and air are passed through pipe 5 to indirect condenser 6, maintained at 50–60° C. where most of the water and a large part of the undesirable constituents are condensed, and removed in receiver 7. The air and vapors then pass to electrical precipitator 8, in which mist and entrained matter are removed and passed into receiver 9, and then to scrubber 10 which is packed with a suitable absorbent material, such as felt, saturated with mineral oil. This serves to absorb any fatty material in the vapors and to remove any ozone formed in the precipitator. The vapors then pass upward through absorber 11, where they come into contact with a fine spray of cold, concentrated coffee extract which effectively absorbs the aromatic coffee principles from the vapors and air. The remaining vapors and air are then discharged at 12.

If the condensation and precipitation operations are sufficiently thorough, the vapors from the precipitator may be free from any fatty odor, and the treatment with an oil absorbent may be unnecessary; however, the oil absorbent performs another function, in that it removes any ozone which may be formed in the electrical precipitator if air is used as the gas passed through the system as a carrier, and hence minimizes oxidation of the aromatic coffee principles by the ozone. Of course, if a gas such as nitrogen is used, no ozone is formed, and no question of its removal is presented.

The amount of aromatic material which is recovered is relatively small, corresponding to about 1 to 2 pounds for every 100 pounds of coffee roasted; but the flavoring capacity of this material is extremely high, and the absorption of this 1 to 2 pounds of material in about 10 gallons of coffee concentrate produces a marked enrichment in its flavor.

A typical run, in which all of the vapors evolved during the roasting of the coffee were passed through a condenser, showed that, for every 100 pounds of coffee, there was a loss in weight during roasting of about 14.25 pounds. Of this, about 8.29 pounds of water and .13 pound of caffeine, together with 3.42 pounds of other material were recovered in the condenser. About 16% of the remainder, or .38 pound, was precipitated in the electrical precipitator, and the remaining 2.03 pounds of material were passed through a tower and scrubbed with cold coffee concentrate, which absorbed about 75% of it, or 1.50 pounds. The $CO_2$ content of the vapors amounted to only .02 pound. Practically all of the valuable material was given off toward the end of the roasting operation.

The proportion of the vapors finally recovered in the coffee product, while relatively small in amount, is nevertheless of great value, as it represents nearly all of the coffee values given off during the roasting operation, and, for example, when incorporated in a coffee concentrate, even at the rate of one or two pounds to ten gallons, increases the strength and enhances the flavor and aroma of the extract to a marked extent.

The product produced by incorporating properly purified and selected roaster gases or vapors in cold coffee concentrate is one which is of great value for use where coffee extracts are desired, such as in flavoring ice-cream and the like, for coffee beverages, carbonated coffee beverages, and the like. Due to the incorporation of readily volatile ingredients ordinarily lost or discarded, the extract, when used in flavoring ice-cream, for example, imparts to the ice-cream a flavor which is perceptible immediately when the ice-cream is introduced into the mouth, instead of after an appreciable period of time as with ordinary coffee ice-cream. Coffee concentrates produced in accordance with the present invention may contain as high as 25% of constituents distilling below 100° C. at normal pressures, indicating the high content of readily volatilized constituents.

Coffee powders, such as dried coffee extracts, and roasted coffee may also be advantageously used to obsorb the aromatic coffee principles from the selected and purified vapors. In such cases, the vapors, after selection and purification, may be passed over trays containing thin layers of dried coffee extract in powder form, or over roasted coffee, or may be brought into intimate contact with such products by passing them through a rotating cylinder containing such products, or in other suitable ways. The desirable vapors are absorbed readily and produce a marked increase in the richness of the coffee product, and a marked enhancement in its flavor.

If, in our novel process, cold coffee concentrate is used to absorb the aromatic coffee principles, the process may advantageously be combined with or supplemented by the process described in the application of Douglas Fronmuller, Serial No. 733,554, filed July 3, 1934, which describes the recovery of the volatile, non-condensable aromatic principles given off during the aqueous extraction of roasted coffee in cold, concentrated coffee extract. Thus, the process of the present invention may be used to incorporate in the coffee concentrate the valuable aromatic principles in the roaster gases, and the resulting enriched extract may be used to absorb the vapors from the extraction operation. Or, the non-condensable vapors from the extraction operation and the valuable, segregated vapors from the roaster gases may be passed through the same absorption tower, either simultaneously or intermittently, and there scrubbed with cold coffee concentrate which absorbs the desirable aromatic principles.

Suitable concentrated coffee extracts may be prepared by infusing roasted coffee beans in hot or boiling water to produce a coffee extract, and concentrating the extract to a strength such that one gallon of extract represents 11 to 15 pounds of coffee beans, more or less, and contains about 25–40% solids.

The present invention may also be advantageously used in conjunction with the process described in the application of Douglas Fronmuller, Serial No. 46,531, filed October 24, 1935, which relates to the production of a coffee concentrate free from sediment-forming ingredients by precipitating the sediment-forming ingredients from the coffee concentrate by lowering the pH value in a regulated manner. If a cold, concentrated extract is used to absorb the volatile aromatic principles in roaster gases in accordance with the present invention, it is desirable to treat such extract in accordance with the said application in order to remove from it any sediment-forming constituents prior to using the extract for the absorption of the volatile aromatic principles.

The concentrated coffee extracts produced in accordance with this invention may be advantageously used for all the purposes for which such extracts are adapted, such as for flavoring ice-cream, producing coffee beverages, carbonated beverages, etc. Soluble coffee powders, having incorporated in them the selected or purified aromatic principles may be similarly used. The process may also be used to incorporated into roasted coffee, particularly ground roasted coffee, the desirable aromatic principles ordinarily lost in the roasting operation.

We claim:

1. The process which comprises roasting coffee, selecting roaster vapors rich in aromatic principles, cooling such vapors to condense and remove readily condensable constituents, including water, precipitating entrained material from the vapors, and incorporating the aromatic principles from the cooled and purified vapors in a coffee product.

2. The process which comprises roasting coffee, selecting roaster vapors rich in aromatic principles, cooling such vapors to condense and remove readily condensable constituents, passing the cooled vapors through an electrical precipitator to remove entrained material, and incorporating the aromatic principles from the purified vapors in a coffee product.

3. The process which comprises roasting coffee, selecting roaster gases rich in aromatic principles, cooling such vapors to remove readily condensable constituents, passing the cooled vapors through a precipitator to remove entrained material, then passing the vapors into intimate contact with an absorbent of oleaginous material, and finally passing the vapors into intimate contact with a coffee product.

4. The process which comprises roasting coffee, selecting roaster vapors rich in aromatic principles, purifying such vapors with precipitation of entrained material and passing them into intimate contact with cold liquid coffee concentrate.

5. The process which comprises roasting coffee, selecting roaster vapors rich in aromatic principles, cooling such vapors to remove readily condensable constituents, including water, precipitating entrained material, further purifying such vapors, and passing the purified vapors into intimate contact with cold liquid coffee concentrate.

6. The process which comprises roasting coffee, selecting roaster vapors rich in aromatic principles, cooling such vapors to remove readily condensable constituents, passing the cooled vapors through a precipitator to remove entrained material, and passing the purified vapors into intimate contact with cold liquid coffee concentrate.

7. The process which comprises roasting coffee in an enclosed roaster, passing a stream of gas through the roaster which carries vapors evolved by the coffee, discarding the vapors from the early stages of the roasting operation, selecting the vapors from the later stages, cooling the selected vapors and carrier gas to remove readily condensable constituents, precipitating entrained material from such selected vapors, and incorporating the aromatic coffee principles contained therein in a coffee product.

8. The process which comprises roasting coffee in an enclosed roaster, passing a stream of gas through the roaster which carries the evolved vapors, discarding the vapors from the early stages of the roasting operation, cooling the vapors and carrier gas from the later stages of the roasting operation to about 50–60° C. to condense out the readily condensable constituents, passing the cooled vapors through a precipitator to remove entrained material, passing the vapors into intimate contact with a solvent for oleaginous material and passing the purified vapors into intimate contact with a coffee product.

9. The process which comprises roasting coffee, in an enclosed roaster, passing a stream of gas through the roaster which carries vapors evolved by the coffee, discarding the vapors from the early stages of the roasting operation, selecting the vapors from the later stages, cooling the selected vapors and carrier gas to remove readily condensable constituents, precipitating entrained material from such selected vapors, and incorporating the aromatic coffee principles contained therein in a cold liquid coffee concentrate.

10. The process of recovering desirable coffee principles evolved during the roasting of coffee which comprises roasting coffee, discarding the vapors from early stages of the roasting operation, selecting the vapors from the later stages, cooling the selected vapors to remove readily condensable constituents, and further purifying such vapors by passing them through an electrical precipitator to remove entrained material and into intimate contact with a solvent for oleaginous material.

GERALD L. WENDT.
DOUGLAS FRONMULLER.